Dec. 10, 1946.  C. R. BUSCH  2,412,388
TRUSSED BRAKE BEAM AND/OR BRAKE HEAD
Original Filed Aug. 5, 1943  2 Sheets-Sheet 1
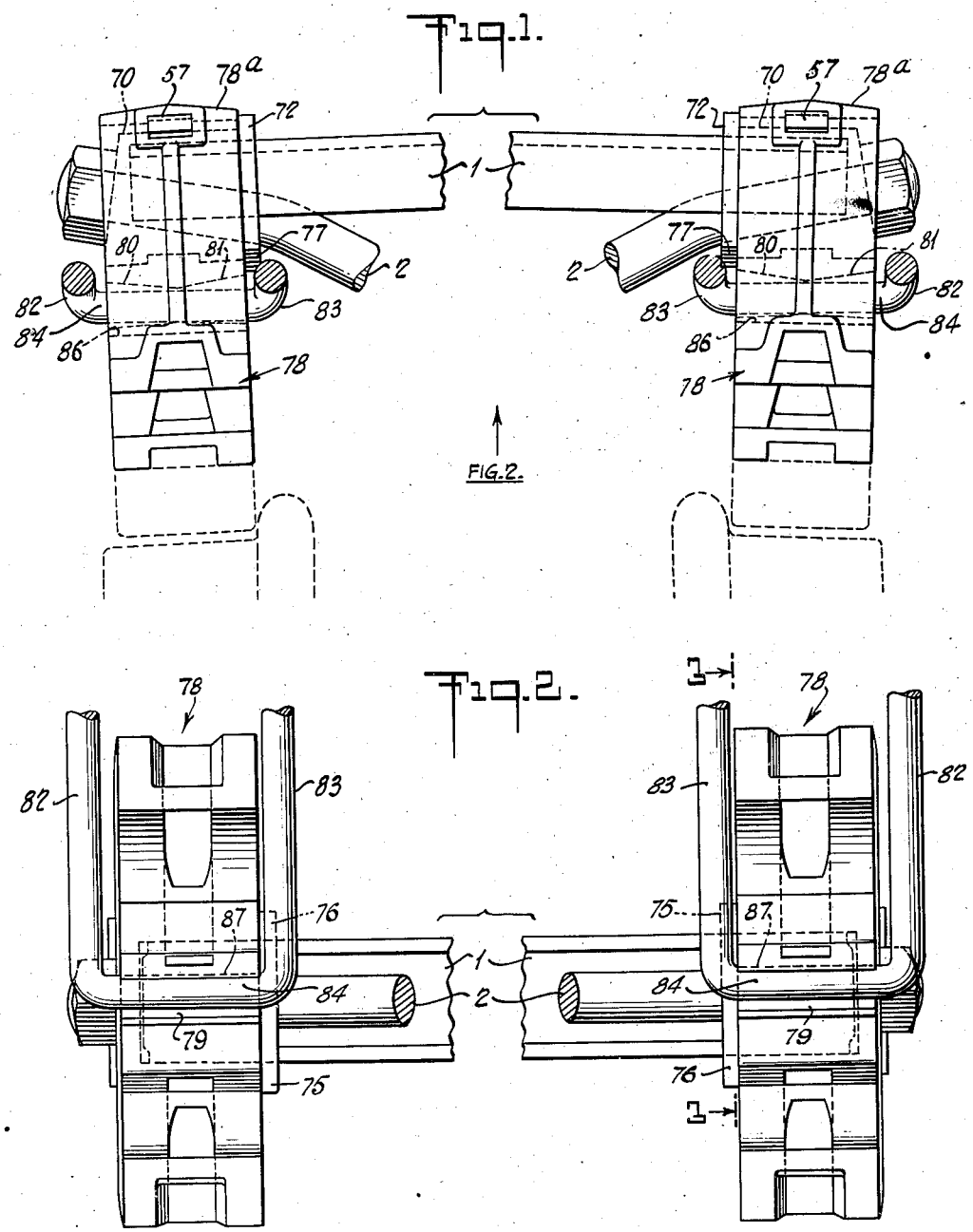
INVENTOR
CHARLES R. BUSCH.
BY
Geo. L. Wheelock
ATTORNEY

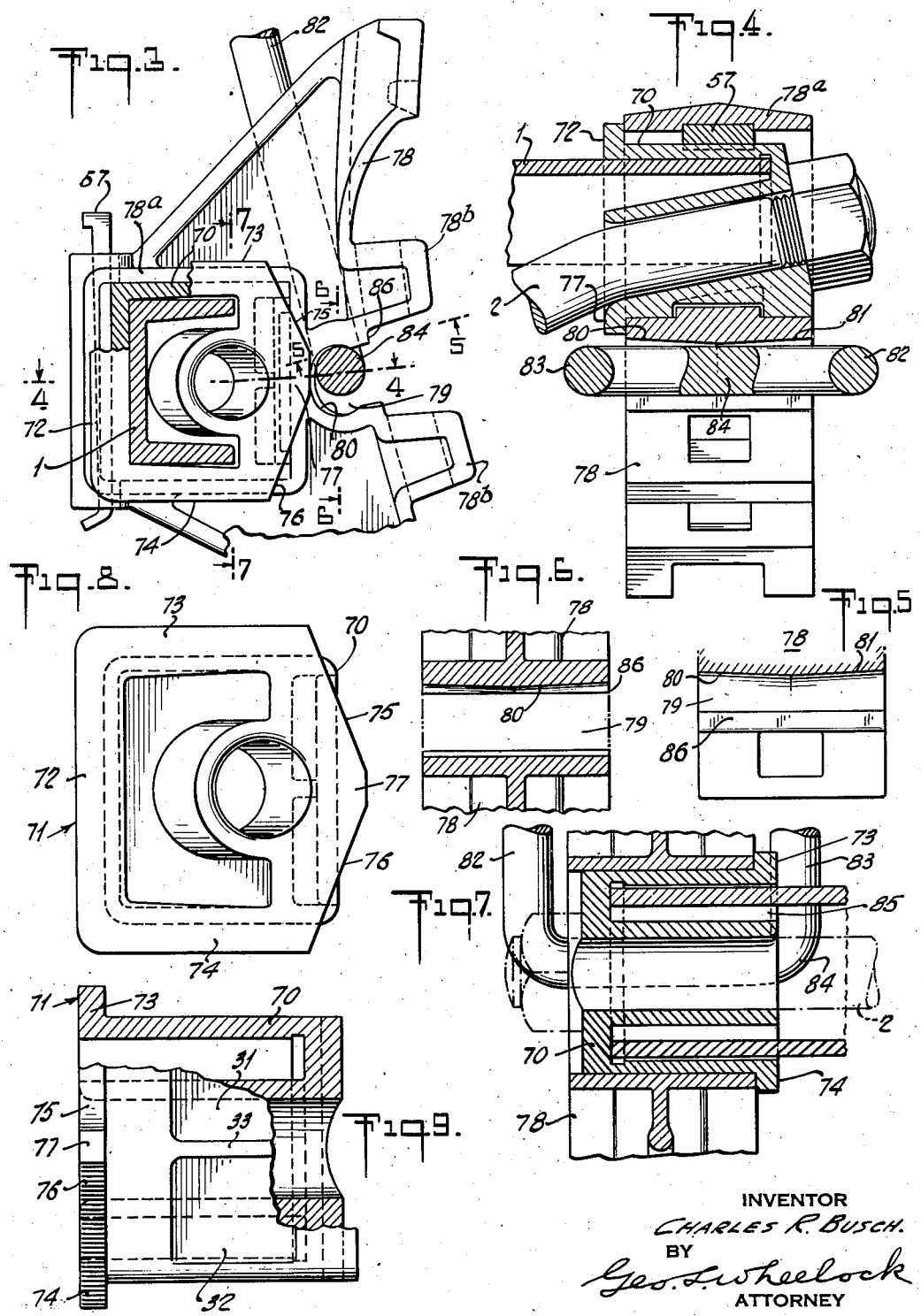

Patented Dec. 10, 1946

2,412,388

UNITED STATES PATENT OFFICE 2,412,388

TRUSSED BRAKE BEAM AND/OR BRAKE HEAD

Charles R. Busch, Orange, N. J., assignor to Buffalo Brake Beam Company, New York, N. Y., a corporation of New York Original application August 5, 1943, Serial No. 497,418, now Patent No. 2,398,918, dated April 23, 1946. Divided and this application June 16, 1944, Serial No. 540,656

10 Claims. (Cl. 188—226)

This application is a division of my application, Serial No. 497,418, filed August 5, 1943, and issued as Patent No. 2,398,918 on Apr. 23, 1946, and relates more particularly to a universal lock for either end of the truss of a brake beam and to a preferably symmetrical, removable brake head, the lock and the head being each adapted to be used at both ends of the beam, that is each may serve as a right and also as a left, and the head in either case preferably adapted to fit onto the lock.

A specific object of the present invention is to adapt such kinds of locks and brake heads for use on the present compression member, tension rod or member, strut and tension nuts of the standard truss brake beams now generally in service on the American railroads, according to the requirements of the American Association of Railroads, to which end such locks and brake heads, serving as they do under the present invention, are so constructed and arranged that a beam provided with them may be hung from the usual pair of swinging hangers without their interfering with the proper serving of the hangers, while at the same time the faces of the heads will have the desired bevel to cause the brake shoes to have the same bevel and to correspond with the bevel of the wheels.

With these and other objects in view, the present invention consists of certain features of construction and combinations of parts to be hereinafter described and claimed, with reference to the accompanying drawings showing a preferred embodiment of the invention in which—

Figure 1 is a plan view of a truss brake beam provided with the present improvements and hung in braking position, parts broken away and in section, and parts in broken lines;

Figure 2 is a front elevation of Figure 1, as viewed in the direction indicated by the arrow;

Figure 3 is an enlarged end view of the beam, partly in broken lines and partly in section, part of the head being broken away, but in this view the brake head is shown in squared up or straight elevation instead of in the canted or inclined position when the beam is hung as in Figures 1 and 2;

Figure 4 is a section on line 4—4, Figure 3, as viewed in the direction indicated by the arrows;

Figure 5 is a section on line 5—5, Figure 3, as viewed in the direction indicated by the arrows;

Figure 6 is a section on line 6—6, Figure 3, as viewed in the direction indicated by the arrows;

Figure 7 is a section on line 7—7, Figure 3, as viewed in the direction indicated by the arrows;

Figure 8 is a detail end view of the truss lock; and

Figure 9 is a side elevation of the lock, partly in vertical section.

In the aforesaid application Serial No. 497,418, of which this one is a division, reference numbers were used which, so far as applicable will be repeated herein, and while the truss lock was not claimed in association with the peculiar brake head of this application, it will first be described herein before describing the brake head.

The compression member 1 and the tension rod 2 are or may be of any desired form having their opposite ends inserted into and fixed in truss locks 70 by the well known adjusting nuts which bear as usual upon the nut seating surfaces of the locks, all as shown in Figures 1, 2 and 4, a truss lock 70 being shown in detail in Figures 8 and 9.

Each truss lock 70 is of general rectangular shape and is internally constructed to receive and seat the ends of the members 1 and 2, and at the end opposite the nut seat, that is the end which is innermost on the brake beam, it is provided with a reinforcing flange 71 including a back portion 72 and upper and lower portions 73, 74, respectively, but neither of the last two extend beyond the front of the lock, inasmuch as it is intended that said lock be used as both a right and as a left, so that it may be applied to either end of the beam. If said flange portions extended beyond the front face of the lock there would usually be interference with the brake hangers. Such construction makes the lock a universal one, instead of using entirely separate dissimilar locks to serve only as a right lock for one end of the beam and another lock to serve only as a left.

The inner end of the universal truss lock 70 is provided with two inclined edges 75, 76, which slant in opposite directions and which if continued would converge in front of the lock, and they form the forward surfaces of the flange portions 73, 74, such inclines extending along the opposite ends of a forwardly projecting, auxiliary, reinforcing flange 77, located at, and symmetrically with respect to, the front of the lock, the inclines tending to converge in a central horizontal plane which bisects the lock. Therefore, when the position of the lock is reversed by turning it upside down at either end of the beam, as indicated by Figure 1, it will serve at either end and provide clearance for each hanger of the beam.

In Figures 1 to 4 inclusive, each brake head 78 is provided with a sleeve or housing 78ª which fits onto its respective truss lock 70, the head being fixed in position thereon by means of a malleable key 57 which is driven between the back wall of the sleeve and the back of said lock, and then the driving end of the key is upset. Then the inner side surfaces of the heads will be up against the reinforcing flanges of the truss lock.

The wall of the hanger opening 79 of the brake head and which is located between the shoe lugs 78ᵇ, 78ᵇ, has two lengthwise conical flares 80, 81, which enlarge in opposite directions with their smaller ends meeting at the central vertical plane between and parallel with the opposite sides of the head. Thus, the wall of the hanger opening is peripherally contracted at the mid-length. The shape of each of the flares may be said to be semi-frusto-conical in general.

In Figures 3 and 4 the brake hanger is shown at the left end of the brake beam, with its side arms 82, 83, at opposite sides of the head 78, and its lower cross bar 84 positioned in the hanger opening 79. However, the position of the head as shown, with respect to the hanger, is only an assumed one, for as a matter of fact when the beam is hung in proper position for use the heads are canted somewhat towards each other as shown in Figures 1 and 2, so that the vertical planes thereof tend to converge at a considerable distance forwardly of the actually hung brake beam.

In any event the assumed relative position of the brake head and the brake hanger, as shown in Figures 3 and 4, clearly demonstrates that when the brake beam is actually hung in using position, as in Figure 1, the cross bar 84 of the left hanger will have its half portion extending from arm 82 in a near approach and in more or less bearing contact with the flaring wall 81, while its other half portion will be a greater distance away from the flaring wall 80. Also, when the beam is hung in using position from the right hanger the inwardly canted brake head at that end will so orient the cross bar of that hanger that the half of the cross bar 84 adjoining the arm 82 at that end will be closer to the flare 80 and the other half will be further away from flare 81. Hence, it will be seen that the same brake head 78 may be used as a right and also as a left. It can be stated in other words that, to permit of such relative positions of the parts stated, the hanger opening 79 enlarges outwardly from its approximate mid-length to its opposite ends, in the horizontal plane of the longitudinal axis of the cross bar positioned therein as well as to a reasonable distance above such plane.

In Figure 7 a broken line 85 indicates that when a proper hanger is used to suspend the brake beam, its side arm 83 lies partly in front of the forwardly projecting reduced reinforcement 77 on the adjacent end of the truss lock, and hence the desirability of cutting off or omitting the upper and lower corners of a reinforcing flange which would otherwise extend fully around that end of the lock is made evident.

If the bevels of the car wheels to be braked are at an angle of one in twenty degrees, which is by far ordinarily the case, then the surface along each of the flares 80, 81, of the hanger opening with relation to the center or axis of the opening should lie at least at such angle, and the contracted throat between said flares should not so closely hug the central portion of the hanger cross bar as to prevent the brake head when used at either end of the beam from canting inwardly at an angle of one degree in twenty or to prevent upward seating of the hanger cross bar at each end of the beam. Under such conditions, if one and the same brake head is applied to either end of the beam a hanger will operate freely at right angles to the rail and will offset the inclination of the toeing in of the head.

Should a better bearing and seating of the hanger cross bar be necessary in the hanger opening in the brake head the opening may have the slightly different shape shown by broken lines in Figures 1 and 2. Here the narrow upper lip 86 of the hanger opening has two flares complementary to but extending in opposite directions from the flares 80, 81, as indicated in Figure 1, while at the top of the opening there is a longitudinal flat surface 87, as indicated in Figure 2, which should be so developed in width that there is a full bearing of the hanger cross bar on such surface for substantially its entire length because the hanger and head at each end of the beam have the two different relative positions shown at both ends of said figures. In such case the flat surface 87 would have inward wedge shaped tapers merging at their smaller inward ends.

It will be obvious to those skilled in the art that the described and illustrated invention is susceptible to more or less modification and still be within the scope of the appended claims.

What I claim as new is:

1. A car brake head provided with shoe lugs and having a forwardly open transverse hanger opening there between, the wall of the opening flaring at the back surface toward opposite ends of the opening, and such back surface being furthest away from the head lugs to provide a head usable as both a right head and as a left head.

2. A car brake head having a forwardly open transverse hanger opening, the back surface of the wall of the opening being peripherally contracted at its approximate mid-length, and such peripheral contraction gradually becoming less toward the upper and lower surfaces of the wall to provide a head usable as a right head and as a left head.

3. A car brake head provided with shoe lugs and having a forwardly open transverse hanger opening there between, the wall of the opening flaring principally at the back surface toward opposite ends of the opening with the same degree of flare at each end to provide a head usable as both a right head and as a left head, in combination with a brake beam hanger whose lower cross bar is located in the opening and extends at an angle inclined to a vertical plane between and equidistant from the opposite lateral sides of the head, the distance between the outer end of the cross bar and the flare opposite that end being less than the distance of the inner end of the bar from the other flare when the hanger and head are in using position.

4. A car brake head provided with shoe lugs and having a forwardly open transverse hanger opening there between, the wall of the opening flaring principally at the back surface toward opposite ends of the opening to provide a head usable as both a right head and as a left head, in combination with a brake beam hanger whose lower cross bar is located in the opening and extends at an angle inclined to a vertical plane between and equidistant from the opposite lateral sides of the head, the back surface of the wall of the opening being at a degree of slant of each of the flares approximating 1 degree in 20, and the degree of inclination of said cross bar in relation to such vertical plane corresponding with such degree whether the head is used as a right hand one or a left hand one.

5. A trussed hanger-supportable brake beam, including a compression member and an adjustable tension member, a universal and interchange truss lock at each end of the beam and having a reinforcing vertical flange at the front of its inner end, the flange partly removed or absent at both its upper and lower ends to render the lock reversible to serve either as a right lock or as a left lock and to provide clearance means for brake hangers at each end of the beam, in combination with brake heads rigidly fixed to the locks, each adapted to serve as a right and as a left head, each head having its hanger opening located in advance of such flange and between the clearance means of its respective lock, and each hanger opening being peripherally contracted at its approximate mid-length by flaring its wall outwardly from the mid-length toward the opposite ends of the opening, whereby to accommodate hangers which in use lie substantially at right angles to the rails.

6. In a brake beam, the combination of a truss having locking means therefor at each end and including lock members of the same universal construction at each end thereof which serve either as a right or as a left, brake hangers the lower bars of which are at right angles to the rails when the hangers are in use, and symmetrical brake heads fixed on the locking members and which are canted forwardly in vertical converging planes, each brake head being identical with the other and having an opening receiving the lower bar of its respective hanger, and the openings being contracted at their approximate mid-lengths and formed to accommodate the hanger bars although the brake heads lie in such canted planes.

7. A car brake head of symmetrical shape having a hanger opening which enlarges outwardly in opposite directions from its approximate mid-length to its ends in the horizontal plane of the longitudinal axis of the cross bar of a hanger, which is to pass therethrough, whereby the head is adapted for use as both a right and a left.

8. In a railway truss type brake beam, arranged for application to a pair of wheels having treads inclined to their common axis, and having a compression member and a tension member converging at the ends of the beam, an end member seated on each end of the compression member and surrounding the adjacent end portion of the tension member and having a head seating element inclined to the longitudinal axis of the beam similarly to the inclination of the portions of the wheel treads to which the beam is applied, a tensioning device seated on each end member and engaging said portion and holding said members assembled, and a brake head mounted on each end member and having a bearing on said seat and having a forwardly facing recess for receiving the cross bar of a swing hanger whereby the beam may be supported, the shoe-mounting face of the head being inclined from the longitudinal axis of the beam to be parallel to the tread of a wheel with which the beam is associated and the axis of which is at a different level than the beam, the head being symmetrical about a vertical axis and applicable to the end member at either end of the beam, and means securing the head to the end member independently of the tensioning device.

9. The combination of a railway brake beam and a hanger for pivotally supporting the beam from the truck frame so as to swing squarely transversely of the longitudinal axis of the beam to and from wheels to which it is applicable, a brake head on each end of the beam, each head having its shoe-mounting face inclined from the longitudinal axis of the beam so as to parallel the inclined tread of the adjacent wheel, each head having a recess receiving the hanger cross bar, the inner side of which recess is inclined from its ends towards the middle of the head to accommodate the inclination of the shoe-mounting face of the head to the axis of the beam, irrespective of the end of the beam to which the head is applied.

10. A railway brake beam head having a recess open at one side for receiving the cross bar of a hanger by which the head and the beam on which it is mounted is suspended, the closed side of the recess being inclined towards the open side from the ends of the recess at the sides of the head to the center of the head to accommodate the inclination of the shoe-mounting face of the head from the axis of the hanger cross bar so that the head may be applied to either end of the beam with its shoe-mounting face parallel to the tread of a car wheel inclined to the axis.

CHARLES R. BUSCH.